July 31, 1973  W. H. MONTGOMERY  3,749,620
PACKAGE FOR PLURAL REACTABLE COMPONENTS WITH
RUPTURABLE ULTRASONIC SEAL
Filed Nov. 20, 1969  3 Sheets-Sheet 2

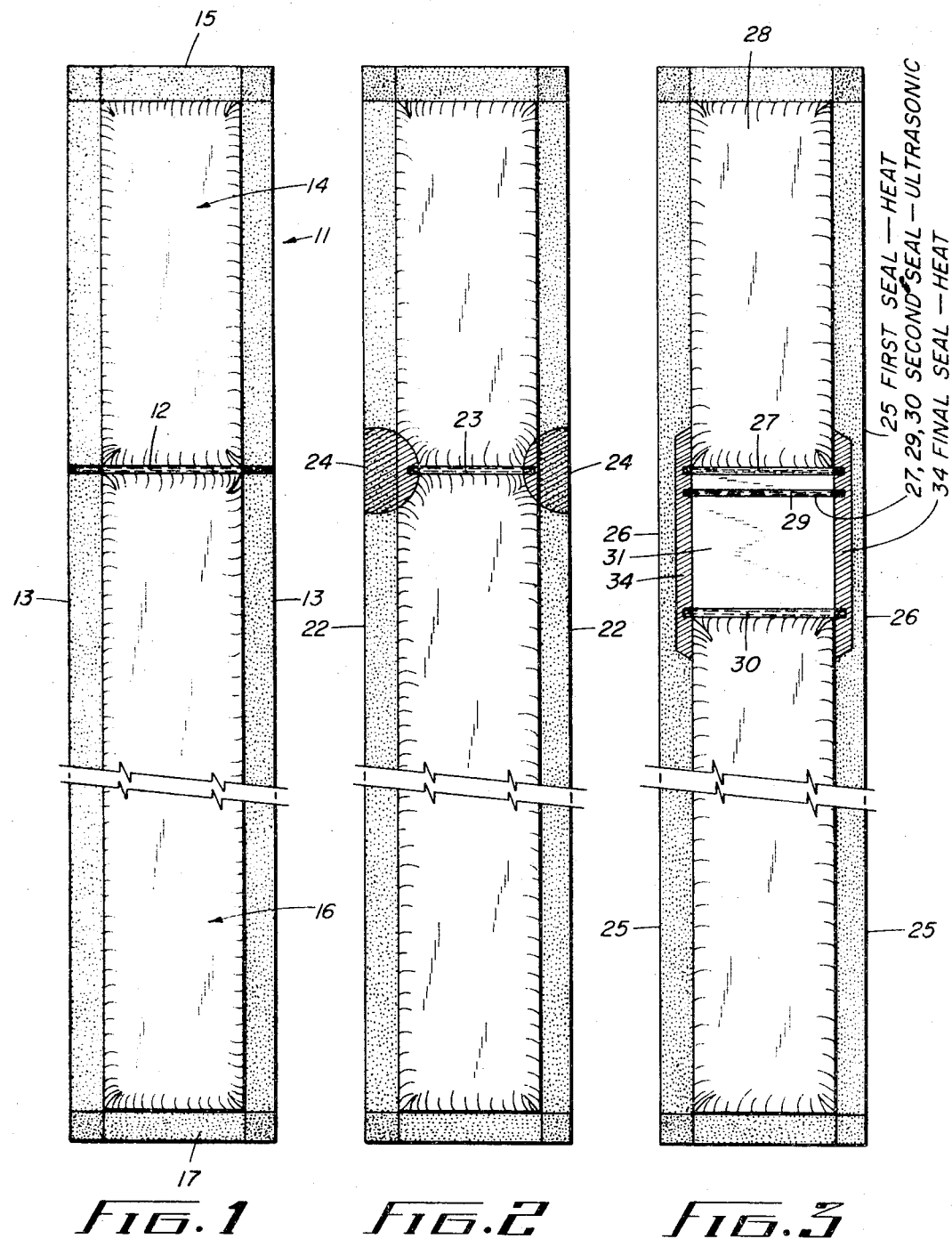

INVENTOR.
WILLIAM HERBERT MONTGOMERY
BY
*Samuel Branch Walker*
ATTORNEY

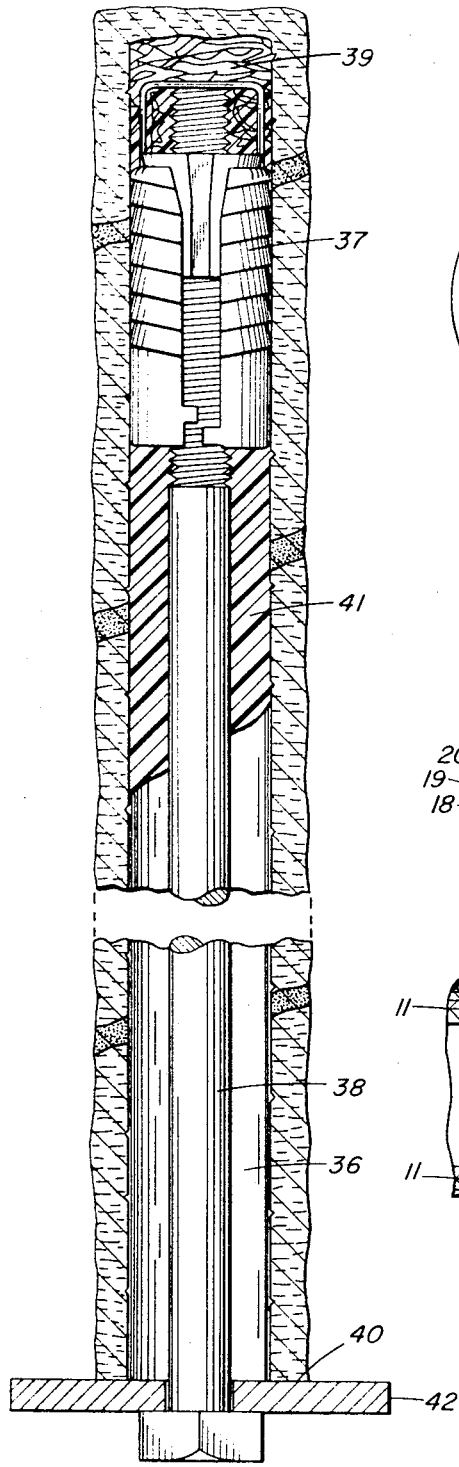
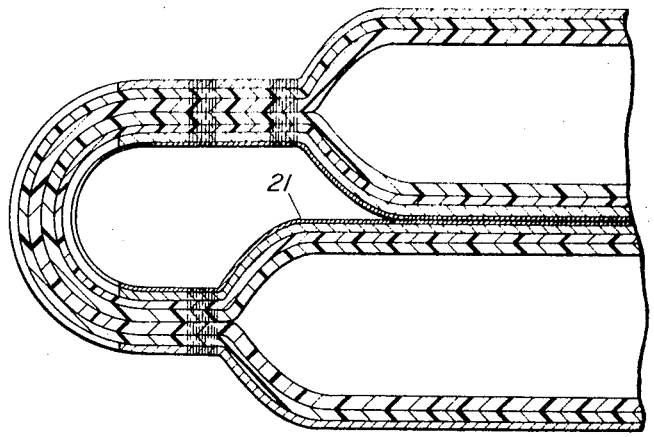
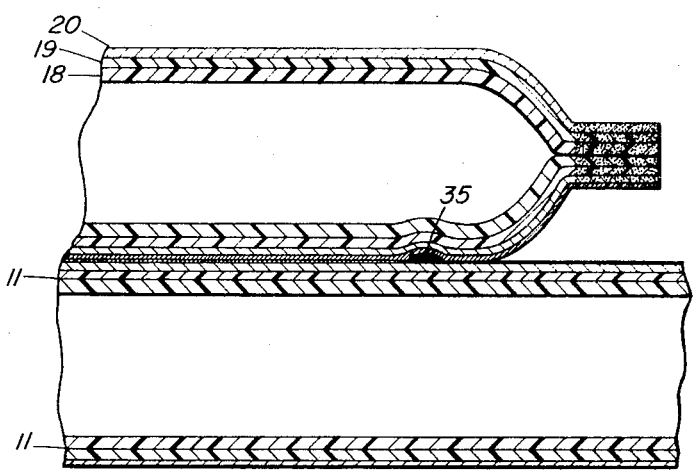
FIG. 6
FIG. 7
FIG. 8
INVENTOR.
WILLIAM HERBERT MONTGOMERY
BY
Samuel Branch Walker
ATTORNEY

United States Patent Office 3,749,620
Patented July 31, 1973

3,749,620
PACKAGE FOR PLURAL REACTABLE COMPONENTS WITH RUPTURABLE ULTRASONIC SEAL
William Herbert Montgomery, Stamford, Conn., assignor to American Cyanamid Company, Stamford, Conn.
Filed Nov. 20, 1969, Ser. No. 878,423
Int. Cl. B32b 31/20
U.S. Cl. 156—73                                     4 Claims

ABSTRACT OF THE DISCLOSURE

A package for a two component system which requires separate, secure storage with rupture of an internal seal to permit mixing of components at the time of use is provided by having at least one and preferably three, ultrasonic seals dividing a laminate film package into compartments, with a perimeter heat seal around the edges of the package, and which seals the ends of the the ultrasonic seals after formation. The space between the ultrasonic seals is a security compartment, and may contain a dye to indicate leakage into the compartment. The compartments contain components for resins, pharmaceuticals, or chemiluminescent systems, or the generation of heat, generation of cold, or photographic processing solutions. Ultrasonic sealing permits a reliable chemical proof seal of predictable and controllable rupture characteristics. The two compartments contain storage stable components, which react on mixing.

The compartments can be generated continuously from continuous strip material in rolls, with edge and barrier seals being continuously formed, and filling nozzles extending into the tubes formed by the sealing. By severing and sealing, a series of double filled compartment packages are continuously formed.

BACKGROUND OF THE INVENTION

Field of the invention

For many commercial products packages are required which store two or more components of a system separately which components are to be mixed at the time of use. Various types of chemical reactions, physical interactions or deleterious interactions occur depending upon the systems. At times one or more components are quite susceptible to damage by atmospheric moisture or room oxygen and the components themselves can be toxic whereas the final mixed product is completely inert. Sometimes the proportions of mixing are quite critical and are not readily measured at time of final use. For all of these purposes there has been a long standing demand for plural component packaging systems in which two or more components are stored separately with provisions being made for mixing or combining at time of use.

The technology involved including both U.S. and foreign patents and publications is much too voluminous to be completely reviewed here. Certain representative embodiments of prior art knowledge are set forth.

Selected prior art

Sawyer, 2,714,974, Aug. 9, 1955, Compartmented Container for Liquids, discloses a plurality of compartments for reactable components to be first mixed, and then dispensed.

Robbins, 2,907,173, Oct. 6, 1959, Method of Forming a Cooling Package, discloses several systems for use in multiple compartment packages in which the contents of compartments are mixed without breaking the outer container.

Robbins, 3,023,587, Mar. 6, 1962, Chemical Cooling Stick for Beverages, shows several multiple compartment cooling systems.

Clements et al., U.S. Pat. 3,028,000, Apr. 3, 1962, Double Channel Plastic Package, discloses side by side compartments with a rupturable seal having stronger and weaker fused spots of substantially equal length; and components of different colors to show the efficacy of mixing.

Forestiere, 3,036,894, May 29, 1962, Method of Using Testing Containers, discloses heat sealed, adhesive sealed and clip compartmentation to separate reagents for sequential reaction in analytical techniques.

Bollmeier et al., 3,074,544, Jan. 22, 1963, Combination Package, discloses a plural compartment package with a web as masking means to induce barrier seal failure to permit component mixing.

Amador, 3,149,943, Sept. 22, 1964, Chemical Refrigerant Package, shows multicomponent systems in plural compartments, which on mixing give cooling.

Dow, 3,190,499, June 22, 1965, Dispensing Container, discloses a disc shaped package with radial seals separating a plurality of compartments, which may contain two component systems such as epoxy adhesives.

Schneider et al., 3,294,227, Dec. 27, 1966, Multiple Compartment Package, discloses a separate interior barrier member folded and face sealed to laminate outer walls, with a peripheral heat seal around the edge of the package, including widened seal areas adjacent the ends of the separate barrier.

McLean 3,324,663, June 13, 1967, Rock Bolting, discloses thixotropic resins in plural compartments, particularly polyester resin systems, and their use in rock bolting. Considerable detail and prior art is recited.

Cope et al., U.S. Patent 3,381,818, May 7, 1968, Dentifrice Package Having a Laminated Film Body, discloses a three layer laminate of an outer aluminum foil, an intermediate polyester film, and an inner polyethylene film as a dead fold laminate for toothpaste tubes.

Montgomery, 3,474,898, Oct. 28, 1969, Package of Reactable Components, discloses certain reactable components for a mine roof bolting resin system, incorporating a thixotropic resin system in a dead fold package. A continuation-in-part thereof is Pat. 3,618,326, Nov. 9, 1971, Resin Anchored Reinforced Brittle Structures.

SUMMARY OF THE INVENTION

It has now been found that a predictably rupturable seal between two laminates is formed by an ultrasonic seal in which two layers of the laminate are compressed in sealing relationship between an ultrasonic mandrel and an anvil. By using an undisturbed laminate over the entire length of the seal a uniform seal is obtained.

If the ultrasonic seal extends to and overlaps a previous heat seal, at the juncture between the ultrasonic seal and the heat seal, the homogeneity of the system is so disturbed that leaks are far more apt to occur. Because the ultrasonic seal is rupturable, the seal must not be too strong and accordingly must not be subjected to shear or other stress before rupture of the ultrasonic seal is desired.

The remaining edges of the package are conveniently heat sealed which readily and conveniently gives a stronger seal which is more resistant to rupture and withstands handling stresses. The heat seal overlaps the ultrasonic seal and because the ultrasonic seal is already formed, the heat seal reinforces the ultrasonic seal where it overlaps at the point of overlap. The heat seal closes the laminate around the edges of the final package and minimizes accidental breakage.

Within these concepts the packages may vary to whatever extent is necessary to encompass the system being stored. For very small packages the heat seal may be comparatively narrow, for larger packages the heat seal is conveniently wider. A width of about ¼ of an inch for a heat seal gives a solid uniform stress resisting seal which will stand the stresses of shipment for packages up to 2 to 5 inches in width and 3 to 30 inches in length. Larger packages may be prepared using heavier foils, and if desired, broader heat seals to give additional strength to the edges.

As used herein the terms "ultrasonic seal" and "heat seal" are used as descriptive of the article itself as well as the method of manufacture. In a conventional heat seal, two jaws grip the laminates, one on each side. One or both of the jaws may be heated. The jaws may be moving members as for example belts which are heated, or through which heat is applied, so that a continuous seal may be formed or the jaws may in fact may be rollers which are hot enough so that the layers are fused together as they pass between the rollers even though the dwell time is comparatively short. With a laminate of transparent polyester material and an interior facing of a polyolefin such as polyethylene or polypropylene, the interior facing is melted sufficiently that substantially complete fusion occurs over the area of the seal which gives a very solid seal, which is resistant to stresses. Part of the polyethylene may be displaced during the sealing operation leaving a peripheral bead or the pressure and heat may be such that it is merely sealed together without major displacement of the sealing polymer. On microscopic examination it can be seen that the polymer from the two films essentially fuses together, with the amount of displacement being immaterial and the polymer has the characteristics of material which has been heated beyond its softening point and hence fused.

In contradistinction the ultrasonic seal shows the effect of pressure and temperature. A mandrel which is driven by an ultrasonic generator tends to compress two laminates together in sealing relationship with the sonic energy being transferred from the mandrel through the laminate film to an anvil. As the ultrasonic energy passes the interface between the two laminates, at least some energy is reflected from the interface and the reflection refraction and associated hysteresis converts mechanical energy to heat tends to increase the generation of heat at this particular point. Additionally the ultrasonic energy gives high instantaneous pressures which tends to cause a displacement of both the polyester layer and the polyethylene layer. On cross-section and microscopic examination the seal can be seen to be considerably narrower than the usual heat seal and the instantaneous pressures are higher while the temperatures are lower and the film shows recognizable characteristics from such treatment. The terms are used more to describe the type of seal as indicative of the seal itself and coincidentally the method of manufacture. The ultrasonic seal and the heat seal are visibly different, particularly when viewed by polarized light. The terms ultrasonic seal and heat seal are descriptive of the types of seals themselves even though the characteristics are difficult to describe and can best be ascertained by microscopic examination of cross-sections of the seals. To those skilled in the art the type of seal is apparent by inspection, particularly with adequate magnification.

Examination by polarized light, particularly if the metal foil layer is removed to permit examination through the film, shows that the flat heat sealed area is more uniform as to color fringes, showing stress, than is the ultrasonic seal. Using a triple continuous edge ultrasonic seal, the distinctive areas of color fringes render identification expedient.

Packages may be formed from a single sheet of film which is folded with the fold providing one side of the package. More conveniently the package is formed by two sheets of film which are sealed around the entire periphery of the package. Because of the difficulty of insuring that two sheets of film are kept in complete register from the time of the ultrasonic seal until the load bearing heat seal is completed, it is usually advantageous to form at least part of the heat seal first.

Conveniently the longer sides can be heat sealed to hold the sheets in register while the ultrasonic seal is being formed. Conveniently the side seals may be narrowed or interrupted so that the ends of the ultrasonic seal come into the area formed by a continuation of the side seals with the ultrasonic seal then being formed; followed by an additional heat seal which completes the side seal subsequent to the ultrasonic seal. If uniform side seals are formed during the initial sealing operation, a protrusion or involution into the package may occur at the location of the ultrasonic seals. Any change in the width of the side seals may result in stress concentration where there is a change of section, which is either an advantage or disadvantage depending upon the purposes to which the package is placed. A change in section aids in internal mixing but may introduce areas of stress concentration at the corners.

The ultrasonic seals, which may be called lateral seals or divisional seals, extend between the side seals as the side seals are ultimately formed by heat sealing. As above mentioned the ultrasonic seals are to be formed first and the heat seal overlaps the ends of the ultrasonic seal to insure package integrity and freedom from leakage at the intersection.

Even though the ultrasonic seals are far more predictable in their characteristics and more readily consistently formed than are heat seals, possible rough handling of the package or mistreatment of the package can be protected against by using more than one internal ultrasonic barrier seal. Conveniently at least two ultrasonic seals are formed. If these are formed close together each is a guarantee of integrity of the package and gives additional security against premature mixing. In one preferred embodiment two such barrier seals are placed close together and a third one is placed farther away with the package folded between the widely spaced seals to give smaller overall final dimensions to the package. The space between each set of seals is in effect a security compartment to protect against leakage. If the films are transparent, a very small quantity of highly colored dye may be placed in the security compartment during manufacture. A dye is chosen which is soluble in the liquid components in the package so that if a liquid leaks into the security compartment, it immediately is highly colored and gives an extremely visible indication of compromise of the security and integrity of the interior barriers.

After the lateral barrier ultrasonic seals are formed the edge heat seals are extended into overlapping relationship with the ultrasonic seals, thus forming a double ended container. Each container is conveniently filled from the open end, and a heat seal placed across the end of the individual compartment. By turning the package with first one end up, and the other, each compartment is separately filled and a heat seal placed across the top thus giving two filled compartments.

Whereas primarily disclosed with two such mixable components, each in its separate compartment, the size and shape of the compartments and in fact the number is a matter of choice. Several compartments may be used for the mixture of several components or several compartments may contain a single component, as for example a resin system in which a hardener is in a small compartment in the center, and the resin in larger compartments on each end, so that hardener need not be transferred as far to mix homogeneously with the resin system. The size of the compartments may vary over extremely wide limits. The volume of each compartment is more determined by the material to be packaged and its uses than by limitations on the present package itself.

An extremely wide variety of materials can be packaged. For example the resin systems described in each of U.S. Pats. 3,474,898 and 3,324,663 supra may be used in packages about 2 to 2½ inches wide and about 18 to 24 inches long to give a quantity of an engineering resin that may be used in thixotropic form in an overhead hole for mine roof bolting or pinning or may be used in a non-thixotropic form in a hole that is horizontal or pointing downward with a rock bolt or foundation bolt or other element to be secured in such hole in rock, concrete or other solid material.

For an engineering resin it is convenient to have a three ply laminate with at least one of the plys of a metallic foil, which gives additional security against leakage through the walls of the package, and insures dead fold characteristics so that when the package is emptied the foil no longer has resilence and will remain in a position into which it is crimped and thus may be forced into the bottom of a drill hole and kept out of the way during the subsequent hardening of the resin.

Packages of resins are useful also for socketing of wire ropes, anchoring devices or any systems in which a small quantity of a hardenable resin is to be used for the locking or retention of some other member.

Transparent films are particularly convenient for luminescent material. Certain chemiluminescent materials are described in a patent to Sheehan 3,470,103, Sept. 30, 1969, Chemiluminescent Composition and Method. The compositions there described are kept in separate compartments in a package for storage and the barrier between the compartments is breached with the components being mixed to yield light at time of use. Such chemiluminescent packages may be used as emergency devices after accidents or wherever a cold light source is desired. Because the present packages are so secure, chemiluminescent packages may be manufactured and kept in secure storage until it is desired to have the light released.

Similarly pharmaceutical compositions may be held in separate compartments for storage, and pre-mixed just prior to time of use. Many pharmaceutical preparations are known in which a liquid diluent such as water or physiological saline is to be used, but which compositions, once diluted with water, are no longer storage stable. By using the present package the barrier seal can be ruptured at time of use; the liquid transferred into a compartment containing a solid which is dissolved and then removed with a hypodermic syringe or otherwise for administration to the patient. The size and shape of such a package is obviously adapted to the pharmaceutical requirements of the material being stored. Frequently a comparatively small package holding only a few cubic centimeters is most convenient. For such a small package an edge seal of an ⅛ of an inch or less gives adequate security and a compact size. A plurality of compartments can be used with different materials to be used sequentially for chemical test purposes, as for example shown by 3,036,894, supra. Here again the compartments may be comparatively small depending upon reaction requirements.

Secure packages are needed for heating and cooling compositions. Pats. 2,907,173 and 3,023,587 show chemical compositions which are stored in separate compartments in a package and which are admixed at time of use to give cooling. Other components may be used which on admixture will give heat. If the peripheral seals are sufficiently secure, with a strong laminate, the heating or cooling effect may be used to heat or cool foods; beverages or part of the human body. In at least some instances the components are such that if the laminate or seal is ruptured, the contents released would be somewhat undesirable or deleterious, or even toxic.

For such heating or cooling the size of the package depends in part upon the thermal requirements of the item to be heated or cooled.

Additionally the present compartment seal may be used for photographic compositions. Certain rapid processing systems are in use in which a small quantity of a developer, fixer or other material is to be spread on one or between two sensitized sheets with a desired photographic process being accomplished by the liquid materials thus made available for spreading. Because of the uniformity required at time of release, the extremely rigorous requirements for secure storage for what may be prolonged periods and the requirement for ready and uniform release over a comparatively wide temperature range at time of final utilization, the requirements for such packages are extremely rigorous. The present use of an ultrasonic seal barrier with peripheral heat seals gives a system which is extremely adaptable to the wide requirements of such photographic systems and at an economical price. If protected for mechanical damage during storage, the releasing seal may be an ultrasonic seal.

Foodstuffs or beverages may be stored in the compartments of the present package. For example, meats, fish, vegetables or other components may be dehydrated and stored in a moisture resistant compartment with the present rupturable seal separating an additional compartment containing water or an aqueous liquid to be mixed with dry foodstuffs. At time of use, the barrier is ruptured, the liquid added to the dry materials, with the dry materials absorbing the water and rapidly becoming reconstituted as a food or beverage depending upon the compositions. The present compartment of packages permits a storage of foodstuffs for long periods for military operations, or for explorers, as well as for the routine household requirements with the packages being storage stable and rapidly reconstitutable. A separate package for heating or cooling as may be desired at time of consumption can be incorporated.

The above are representative of the types of materials that may be stored in the present package. Obviously it is impossible to list all systems or conditions of multi-component storage which have commercial utility within the present specification without unduly extending the length of the description. Such obvious variants are of course obvious to those skilled in the arts of packaging.

For specialized uses such as in mine roof bolting, and other engineering applications in which the package is to be inserted in a small hole, a relatively small narrow package is required. For many uses, the application has no restriction on the size of the package. For such uses, rectangular, round, or other shapes may be used. Parallel tubular compartments such as shown in 3,028,000, supra, are satisfactory for many uses, if of small overall diameter, even for engineering applications. Such packages are economical because the parallel compartments can be filled continuously as the package is formed from a continuous roll of laminate, with the seals being formed continuously, and a separate nozzle extending far enough into each formed compartment that each compartment may be filled without risk of compromising component isolation or package integrity. The continuously formed tubes are separated into selected lengths by cross heat seals. The single longitudinal edge heat seal for a doubled strip, or two edge seals for two strips, is formed by continuous movement of heated rolls or belts, and the intermediate ultrasonic seal, or seals, by a pair of cooperating sealing wheels, with the ultrasonic energy either being generated in one of the wheels; or by a stationary generator, with transfer through the axle; or by a stationary generator inside the wheel, with a liquid coupling to transfer energy to the wheel adjacent to the seal position, and hence into the seal or by an anvil and ultrasonic mandrel mounted on a sliding device, which will permit the placement of an ultrasonic seal while the package is proceeding in a continuous manner through the process of converting the packaging material into a package and the filling thereof.

Whereas certain packaging laminates, certain types of packaged components, and certain types of sealing are disclosed herein by example, to reduce the length of what would otherwise become an intolerably prolix specification, the number of examples is minimized.

In the drawings:

FIG. 1 is a rectangular package with a single rupturable ultrasonic seal dividing.

FIG. 2 is a rectangular package with a single rupturable ultrasonic seal extending only partially between the edge seals and an overlapping final heat seal.

FIG. 3 shows a rectangular package with plural ultrasonic seals, a first forming of indented edge seals, then the ultrasonic seals followed by completion of the heat edge seals.

FIG. 6 is an enlarged cross-sectional view showing part of the package of FIG. 5 adjacent the fold. The thicknesses of each layer of the laminate is greatly enlarged for clarity.

FIG. 7 is an enlarged cross-sectional view of FIG. 5 taken adjacent the end of the shorter compartment.

FIG. 8 is a view in partial sections of one of the present packages used as a rock bolt adhesive.

Figure 4:
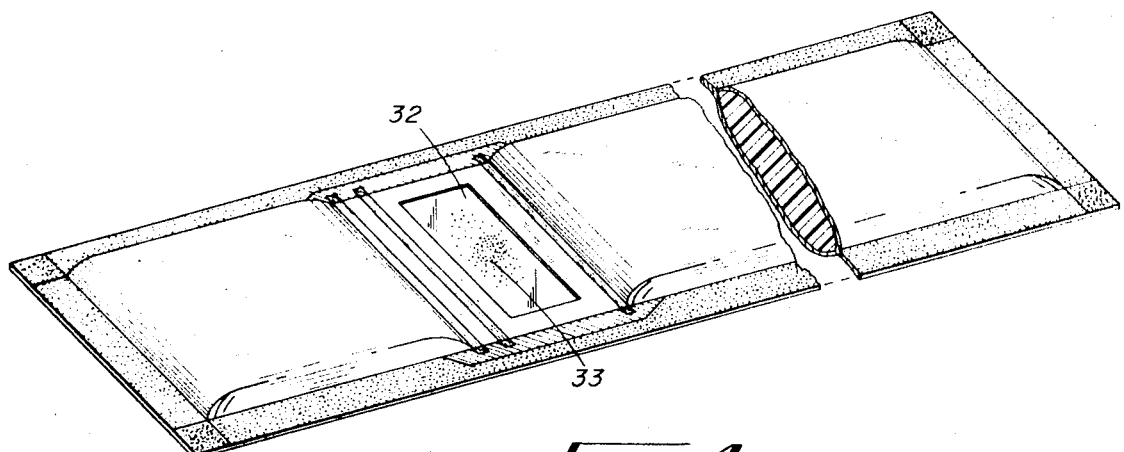
FIG. 4 shows a package in which a security compartment has a transparent window, with an indicator in the security compartment to serve as a leak detector.

As shown in FIG. 1 rectangular sheets of laminate 11 are placed in coordinate configurations and held in such location while an ultrasonic seal 12 is formed across the entire width of the package. Without subjecting the ultrasonic seal to stress, a full edge seal 13 is placed the full length of each of the two side edges of the package to seal together the two side edges in firm secure relationship. The materials to be stored, at least one of which is either a liquid or has fluent characteristics, are separately filled. The shorter compartment 14 has one material filled therein after which a first end seal 15 closes the compartment. The package may then be inverted the second compartment 16 filled and a second heat seal 17 used to close the second compartment.

The laminate itself is conveniently of two or three layers with the inner layer 18 being polyethylene or polypropylene for sealing the central layer 19 being of polyester for strength and a third layer of metallic foil 20 for dead seal characteristics. One such film is shown in Pat. 3,381,818 supra. If desired the surface of the metallic foil may have a print coating 21 thereon for printing of instructions, identification or advertising on one or both faces of the final package. Such printing films and printing is conventional. As the same laminate or type of laminate is used for any of the packages, the same number are used to designate the laminate layer throughout this description.

FIG. 2 shows a somewhat similar package in which the full edge heat seals 22 are formed first with a rupturable barrier 23 formed by an ultrasonic seal. The rupturable barrier ultrasonic seal is short enough so that even allowing for manufacturing tolerances the ultrasonic seal does not extend to or touch the edge heat seals. It is formed between undisturbed laminates, which are of uniform thickness and characteristics. After the formation of the rupturable barrier 23 the rupturable barrier and the edge seals are joined by linking heat seals 24 which extend over the heat seals 22 and the rupturable ultrasonic barrier 23, each being preformed. The linking heat seals unite and prevent leakage between the ends of the rupturable ultrasonic barrier 23 and the edge seals 22. Because the linking heat seal 24 is primarily to avoid leakage, the seal needs to be secure but need not be rupturable, hence there is no danger of over-sealing or weakening the seals which have already been formed, and a leakproof jointure is accomplished.

FIG. 3 shows a two step edge seal system in which the laminates are sealed together by primary edge heat seals 25 which extends along the entire length of the edges which is indented in width adjacent to the position for the barrier seals. A narrow edge heat seal 26 is used which has only such width as will insure that the two laminates are held in position during the formation of the barrier ultrasonic seals. In FIG. 3 are shown three barrier ultrasonic seals. A first ultrasonic barrier seal 27 forms the bottom for a first compartment 28 with a security ultrasonic barrier seal 29 closely adjacent to the first ultrasonic barrier seal. At a greater distance a third ultrasonic cross seal 30 is emplaced leaving a space as a security compartment 31. If the laminates are transparent or if a portion of a metallic foil is etched away to leave a window 32 as shown in FIG. 4, an indicator 33 may be placed in the security compartment 31 which by dissolving in or reacting with any leaking liquid serves as a leak detector.

After the ultrasonic seals are formed, which seals may be formed simultaneously or sequentially, a final edge heat seal 34 fills the indentation in the primary edge heat seal so that the edge heat seal is of uniform width throughout with the final edge heat seal overlapping both the primary edge heat seal and the ends of all three ultrasonic barrier seals thereby giving complete security to the compartments formed and serving as triple protection against premature mixing as well as having an indicator to give evidence of leakage should such occur.

In the FIG. 3 a stripped area indicates the primary edge heat seal 25, a narrow double dash the ultrasonic barrer seals 27, 29, 30, and a cross-hatching the final edge heat seal 34.

Figure 5:
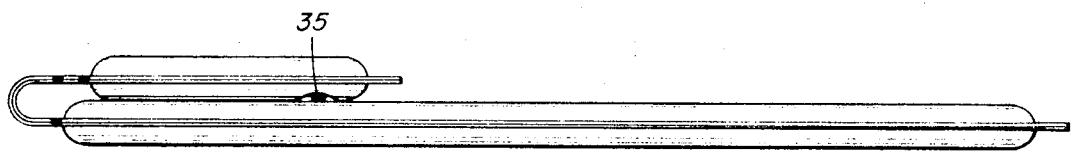
FIG. 5 shows a folded package in which the package is folded back over itself in the area of the security compartment to reduce the overall dimensions of the final package, for convenience in shipment.

As shown in FIG. 5 after the compartments are filled, using the processes above described, the completed package is folded back upon itself with a small retaining adhesive spot 35.

As can be seen from FIG. 5, if the package is comparatively long the ends can slip with respect to each other during shipment or storage which could throw an additional strain on the rupturable barrier seals.

A pressure sealable adhesive, a drying adhesive, or a double faced adhesive tape is placed to hold the two ends of the completed package in fixed relationship during storage and prior to final usage.

The filling and closing of the compartments is as above described.

The seals are formed on conventional equipment. The heat seals may be formed on any of the conventional sealing machines. An impulse sealer gives good results. A bar sealer, with a heated element covered with a polytetrafluorethylene (Teflon) fabric for heat transfer, and non-stick characteristics, is pressed against a similarly covered anvil to form the heat seal. The shape is that of the desired seal. The time and temperature for the seal is best determined by inspection. The seal heater is hot enough to slightly displace the polyethylene, under the pressures used. One good seal is formed on a "Doughboy" sealer using continuous "Teflon" coated steel belts, in which the edges are sealed under heat and pressure.

Similarly the ultrasonic seal is formed on a conventional ultrasonic sealing machine. The anvil is large enough to more than cover the pressure bar, and a pressure bar with three edges each about 1/64 inch wide and 1/64 inch apart is used. A Branson ultrasonic generator is used, with sufficient drive to give a seal which is liquid tight but rupturable.

Inspection of the seals shows if the seals have the desired rupture characteristics, with minor adjustments being made during use.

Contents are not shown in FIGS. 6 and 7, as the laminates are more clearly seen without the illustration of contents, and the nature of the contents is immaterial as long as one is liquid, or a flowable material capable of transmitting hydrostatic pressure to the rupturable ultrasonic seal when pressure is applied to the barrier by such hydrostatic pressure.

At time of use, the user applies pressure to one of the compartments which has a fluent material therein, such as a liquid resin composition or a liquid hardener which by hydrostatic pressure tends to separate the sheets of laminate and hence applies a delaminating force to the ultrasonic barrier seals. The ultrasonic seals are readily ruptured, to permitting the liquid to flow past the ultrasonic barrier seal towards the other compartment. All of the barrier seals are ruptured in this fashion which permits complete transfer from one compartment towards the other and by squeezing the material in the package, with the ruptured seals no longer preventing movement, thorough intermixing or such degree of intermixing as may be desired is achieved.

Because the barrier seals are much more easily ruptured than the edge seals, the mixing can be achieved with a minimum of danger of releasing the contents by rupture of an edge seal. Obviously in storage if undue pressure is accidentally placed upon a compartment containing a fluid material, the barrier seals will be ruptured accidentally as the same pressure ruptures the barrier seals whether intentional or accidental.

The edge seals are heavy seals and sufficiently secure that in general the laminate itself ruptures before the security of the edge heat seals is compromised.

If the edge seals are bent, or crumpled, and hence weakened, rupture can occur at such location. If the laminate is scratched, or wrinkled or otherwise subject to treatment that induces local stress concentration, rupture can occur at such point.

After the contents are mixed for final dispensing, if a dispensing application is used a tear or simple heavy pressure will rupture the laminate and release the contents. By the same token a laminate is chosen which has such film thickness of the polyester layer that the film will stand pressures which permit mixing and such handling as may be desired. For dispensing applications, it is desired that the compartments release their contents and hence a thickness of laminate is chosen such that the laminate itself ruptures at a reasonable pressure.

For some uses such as in rock bolt work or pharmaceutical work, the laminate is torn or punctured at the time of use.

Whereas the present invention has been largely described with respect to an inner polyethylene film, a center polyester film and an external metallic foil film, other materials of construction can be used which have strength and meltability characteristics with respect to each other which may be desired for a particular application.

The size and use characteristics of the present packages is controlled more by the desires of the user than any inherent limitations and hence characteristics are chosen which permit such stress resistance and handleability both before, during or after usage as may be desired for a particular application.

FIG. 8 is exemplary of use in mine roof work. The package has a configuration of about 2 to 2½" width and a length of 16 to 24 inches. The contents are storage stable, and just prior to use, the barrier seal is ruptured, the contents mixed, the package inserted in a drill hole 36, and the package shoved to the far end, and broken by the insertion of a roof bolt shell anchor 37 on the end of a roof bolt 38. The crumpled package 39 is pushed to the far end of the bolt hole, with the resin being expressed around the roof bolt shell anchor. As the shell anchor is tightened, the roof bolt plate 42 is brought up against the mine roof 40, and load is retained by tension in the bolt. The resin contents 41 surrounds and protects the expanded shell anchor giving greater bearing area and lower unit strain in the area of anchorage than is the case when a shell anchor is used alone, thus improving the over-all efficiency of the rock bolt assembly, as well as its durability.

Resins such as disclosed in Pats. 3,474,898 and 3,324,663 supra give good results.

A package of transparent laminate of polyester and polyethylene is prepared containing the luminescent components disclosed in 3,470,103 supra. The package is storage stable, and on mixing gives luminescence. The package can be moved about to a location where light is desired.

In one compartment of a package as above described, having an interior compartment size adapted to contain about 10 milliliters of liquid is packaged solid penicillin as described in 2,619,447, Malcolm and Vance, Injectable Penicillin Preparations. In the other compartment, is packaged 5 milliliters of water for injection; sterile techniques being used in the formation and sealing of the packages. At time of use, the water is forced through the rupturable seal, and into the drug compartment. After solution, or suspension, the medicament is withdrawn using a hypodermic needle, and injected into a patient.

Obviously the size of dosages, and hence the size of packages designed to hold the medicament is governed by the therapeutic requirements of the user. For topical application, sterility is not mandatory, and clean techniques may be used.

I claim:

1. A method of forming a plural compartment mixing package of flexible laminate at least the inner layer of which is thermoplastic and which seals to itself on heating and at least one strong adjacent layer which has a higher melting point comprising:

forming at least one seal by the application of pressure and ultrasonic energy to form a separable seal between portions of the laminates which are to form separate compartments of the package, the entire ultrasonic seal being between undisturbed portions of laminate, and without permitting shear stress to weaken portions of the ultrasonic seal, subsequently applying heat and pressure to fuse the laminate sheets together around at least a portion of their periphery to form a heat seal which heat seal overlaps the ends of the ultrasonic seal and is stronger than the ultrasonic seal and maintains seal integrity at the juncture of the ultrasonic seal and the heat seal.

2. The method of claim 1 in which at least one lateral ultrasonic seal is applied first, positively securing the laminates against lateral displacement and subsequently heat sealing along each edge overlapping the ends of the ultrasonic seal.

3. The method of claim 1 in which two laminates are heat sealed along the edges with a seal of markedly reduced width on each edge at intermediate portions adjacent the location of the ultrasonic seals thereby securing the two laminates together and protecting against shear stresses then ultrasonic sealing the secured laminates together laterally between the heat seals, with the ends of the ultrasonic seal extended towards the narrow portions of the edge heat seals, the entire ultrasonic seal being between undisturbed portions of laminate, and after the formation of the ultrasonic seal subsequently heat sealing over the ends of the ultrasonic seal to give uniform width to the final heat seal while insuring against shear stresses adjacent the ultrasonic seal, which shear stresses might compromise package integrity.

4. The method of claim 1 in which, in any order, two laminates forming an elongated two compartment package are (a) heat sealed along two longitudinal edges to form the edges of the package and (b) are ultrasonically sealed transversely between the two longitudinal heat seals, with a gap between the ends of the ultrasonic seal and the two heat seals, and subsequent to the formation of said two longitudinal heat seals and the transverse ultrasonic seal, forming a final heat seal by heating and sealing together areas of the laminate that overlap the ends of said lateral ultrasonic seal and the said longitudinal heat seals.

References Cited

UNITED STATES PATENTS

| | | | |
|---|---|---|---|
| 3,306,328 | 2/1967 | Markus | 156—73 |
| 3,294,616 | 12/1966 | Linsky et al. | 156—73 |
| 3,483,073 | 12/1969 | Pounder et al. | 156—73 |
| 3,222,235 | 12/1965 | Buchner | 156—73 |
| 3,459,610 | 8/1969 | Dijkers et al. | 156—73 |
| 3,222,239 | 12/1965 | Deans | 156—73 |
| 3,505,136 | 4/1970 | Attwood | 156—73 |
| 3,519,507 | 7/1970 | Pierson | 156—73 |

OTHER REFERENCES

"How To Get Good Ultrasonic Welds," E. Obeda, Modern Plastics, November 1964, p. 130.

"Ultrasonic Welding," H. Deans, Modern Plastics Encyclopedia, 1966, p. 980.

BENJAMIN A. BORCHELT, Primary Examiner

J. V. DORAMUS, Assistant Examiner

U.S. Cl. X.R.

156—380